US009536297B2

(12) United States Patent
Araki et al.

(10) Patent No.: US 9,536,297 B2
(45) Date of Patent: Jan. 3, 2017

(54) APPARATUS, SYSTEM, AND METHOD OF INSPECTING IMAGE, AND RECORDING MEDIUM STORING IMAGE INSPECTION CONTROL PROGRAM

(71) Applicants: Ato Araki, Ota (JP); Tadashi Kitai, Zama (JP)

(72) Inventors: Ato Araki, Ota (JP); Tadashi Kitai, Zama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/212,996

(22) Filed: Mar. 14, 2014

(65) Prior Publication Data

US 2014/0341437 A1  Nov. 20, 2014
US 2016/0335760 A9  Nov. 17, 2016

(30) Foreign Application Priority Data

Mar. 15, 2013 (JP) .................................. 2013-053994
Dec. 25, 2013 (JP) .................................. 2013-267496

(51) Int. Cl.
  *G06K 9/00* (2006.01)
  *G06T 7/00* (2006.01)

(52) U.S. Cl.
  CPC ...... *G06T 7/001* (2013.01); *G06T 2207/10008* (2013.01); *G06T 2207/30144* (2013.01); *G06T 2207/30176* (2013.01)

(58) Field of Classification Search
  None
  See application file for complete search history.

(56) References Cited

U.S. PATENT DOCUMENTS

| 5,619,429 | A  | * | 4/1997  | Aloni et al. ................... 700/279 |
| 5,894,528 | A  | * | 4/1999  | Yasumi et al. ................ 382/302 |
| 7,020,350 | B2 | * | 3/2006  | Sakai et al. ................... 382/294 |
| 2005/0286922 | A1 | * | 12/2005 | Oki ................................ 399/75 |
| 2006/0110009 | A1 | * | 5/2006  | Klassen et al. ............... 382/112 |
| 2006/0158703 | A1 | * | 7/2006  | Kisilev et al. ............... 358/504 |
| 2007/0206881 | A1 | * | 9/2007  | Ashikaga ..................... 382/294 |
| 2008/0118145 | A1 | * | 5/2008  | Kim et al. .................... 382/165 |
| 2009/0238432 | A1 | * | 9/2009  | Can et al. ..................... 382/132 |
| 2012/0121139 | A1 | * | 5/2012  | Kojima et al. ............... 382/112 |
| 2014/0348393 | A1 | * | 11/2014 | Kogan ......................... 382/112 |

FOREIGN PATENT DOCUMENTS

JP  2005-094163  4/2005
JP  2006-007659  1/2006

* cited by examiner

*Primary Examiner* — Sumati Lefkowitz
*Assistant Examiner* — Carol Wang
(74) *Attorney, Agent, or Firm* — Oblon, McClelland, Maier & Neustadt, L.L.P.

(57) ABSTRACT

An image inspection apparatus for inspecting an image output on a recording medium. The image inspection apparatus includes processing circuitry that obtains data of an output-target image used by an image forming apparatus to conduct an image forming operation, generates read data from the data of the output-target image, and generates an inspection reference image from the data of the output-target image. The apparatus also performs position alignment between the read image and the inspection reference image, conducts an inspection which determines a defect in the read image based on the difference of the aligned read image and the inspection reference image, and determines whether a position alignment defect exists in the read image based on the defect detected during inspection.

5 Claims, 12 Drawing Sheets

READ IMAGE　　　　　　MASTER IMAGE

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application No. JP 2013-053994, filed on Mar. 15, 2013 and No. JP 2013-267496, filed on Dec. 25, 2013, in the Japan Patent Office, the entire disclosure of which is hereby incorporated by reference.

BACKGROUND

Field of the Invention

The present invention relates to an apparatus, system, and method of inspecting an image formed by an image forming apparatus, and a recording medium storing an image inspection control program.

Description of the Related Art

Conventionally, the inspection of printed matter has been performed by human operators. In recent years, inspection apparatuses that automatically inspect printed matter have been widely used, mainly in the field of offset printing. For example, in conventional devices, a master image is generated by reading specific printed matter that is selected based on the image quality, as a reference image. The corresponding portions of the master image and a subsequently read image of printed matter would be compared to determine, by the degree of difference therebetween, whether there was a defect in the printed matter.

Printing apparatuses, such as electrophotographic apparatus, have been widely used to print a small number of pages. For example, a printing apparatus may perform variable printing in which the printed contents differ on each page. In such case, comparing the printed matter with the master image generated from the previously printed matter would be inefficient. In view of this, the master image has typically been generated based on print data and then compared with the printed image to be inspected.

With respect to the comparing inspection of the image, Japanese Patent Application Publication No. 2006-007659-A proposes a method of generating image data of a defective part in a resolution higher than at the time of the inspection of the printed matter in which the defect was detected, and enlargedly displaying an enlarged depiction of the defective part.

In consideration of a position shift with the master image and the read image of the printed matter, a comparison process can be performed multiple times while shifting the master image and the read image vertically and horizontally. Utilization of the comparison result of a state with few degrees of the difference can also be performed. Accordingly, since the starting point at the time of comparing the master image with the read image is set as correctly as possible, position alignment with the master image and the read image may be performed utilizing the comparison process and shifting of the images vertically and horizontally.

Moreover, the position alignment of the master image and the read image of printed matter involves performing a rotational correction process with respect to one side based on a certain reference point. As a reference point, a printer's mark used as the mark of a cutting and some characterizing portions (i.e., a corner part, etc.) in an image can be used.

However, a reference point suitable for position alignment cannot always be extracted from an image. Therefore, when a reference point suitable for position alignment cannot be extracted, the rotational correction process may become inadequate for aligning the read image and the master image. If a shift has arisen such that position alignment is inadequate in the comparison area of both images, it may be determined that there is a defect despite normal printed matter if during inspection it is determined that the degree of the difference is high.

Accordingly, in order to provide a more accurate inspection, the range over which the image is shifted vertically and horizontally in the case of the comparison of the read image and the master image is extended. Each difference value is then calculated and considered in order to extract a reference point suitable for position alignment. However, such a process may increase the computation time and when the processing time for an inspection has restrictions, such as the processing capacity of an inspection apparatus, the inspection process may end in the middle of a calculation due to the restrictions on processing time. In such an instance, the inspection process may not be completed and the correct result may not be obtained and it may be erroneously determined that the printed matter has a defect.

Accordingly, during the inspection of the printed matter by an inspection apparatus, even though there is no defect in the printed matter it may be determined that a defect exists in the printed matter based on a defect in the position alignment thereby providing an incorrect inspection result. Therefore, the user will then need to confirm whether the printed matter judged to be defective is truly defective thereby creating a large burden for the user. Moreover, even if it is a case where the technique of JP No. 2006-007659-A is employed such that the resolution of the defective part of the printed matter is made high and is prominently displayed, it still cannot be determined whether the printed matter truly contains a defect without confirmation from a user.

SUMMARY

An image inspection apparatus for inspecting an image output on a recording medium. The image inspection apparatus includes processing circuitry that obtains data of an output-target image used by an image forming apparatus to conduct an image forming operation, generates read data from the data of the output-target image, and generates an inspection reference image from the data of the output-target image. The apparatus also performs position alignment between the read image and the inspection reference image, conducts an inspection which determines a defect in the read image based on the difference of the aligned read image and the inspection reference image, and determines whether a position alignment defect exists in the read image based on the defect detected during inspection.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
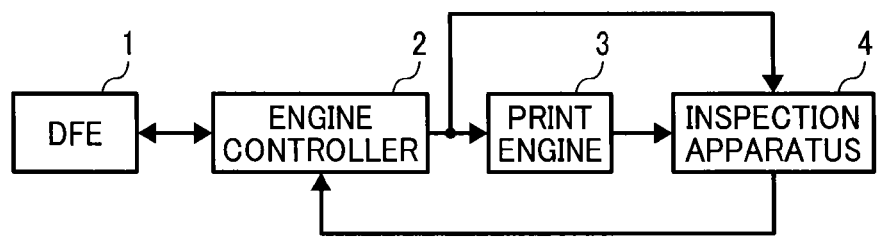
FIG. 1 is a schematic block diagram illustrating an image forming system including an inspection apparatus, according to an exemplary embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXEMPLARY EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) calculators or the like. These terms in general may be referred to as processors and/or circuitry.

Unless specifically stated otherwise, or as is apparent from the discussion, terms such as "processing" or "calculating" or "calculating" or "determining" or "displaying" or the like, refer to the action and processes of a calculator system, or similar electronic calculating device, that manipulates and transforms data represented as physical, electronic quantities within the calculator system's registers and memories into other data similarly represented as physical quantities within the calculator system memories or registers or other such information storage, transmission or display devices.

FIG. 1 illustrates an example configuration of an image forming system according to an exemplary embodiment. As shown in FIG. 1, the image forming system includes, for example, a digital front end (DFE) 1, an engine controller 2, a print engine 3 and an inspection apparatus 4.

Based on a received print job, the DFE 1 generates bitmap data, which is image data to be output (i.e., output-target image), and outputs the generated bitmap data to the engine controller 2. Based on the bitmap data received from the DFE 1, the engine controller 2 controls the print engine 3 to conduct an image forming operation. Further, the engine controller 2 transmits the bitmap data received from the DFE 1 to the inspection apparatus 4. The bitmap data is then used as original information data to generate an inspection reference image to be used for inspection at the inspection apparatus 4 when the inspection apparatus 4 inspects an output result of an image forming operation of the print engine 3.

Under the control of the engine controller 2, the print engine 3 conducts an image forming operation on a recording medium using the bitmap data, scans, based on the image forming operation, an output paper such as a paper printed with an image using a scanner, and inputs the scanned image data to the inspection apparatus 4. The recording medium may be, for example, a sheet such as paper, film, plastic sheet, and any material that can be used for outputting (i.e., forming) an image by an image forming operation. Based on the bitmap data input from the engine controller 2, the inspection apparatus 4 generates a master image. Then, the inspection apparatus 4 conducts image inspection by comparing the read image data, input from the print engine 3, and the generated master image to, wherein the inspection apparatus 4 is used as an image inspection apparatus.

When the inspection apparatus 4 compares the read image generated from the printed image and determines that there is a defect in the output result, the inspection apparatus 4 notifies the engine controller 2 of the page determined to be defective. Accordingly, at this point and based on the output result, the engine controller 2 can reprint the defective page.

Figure 2:
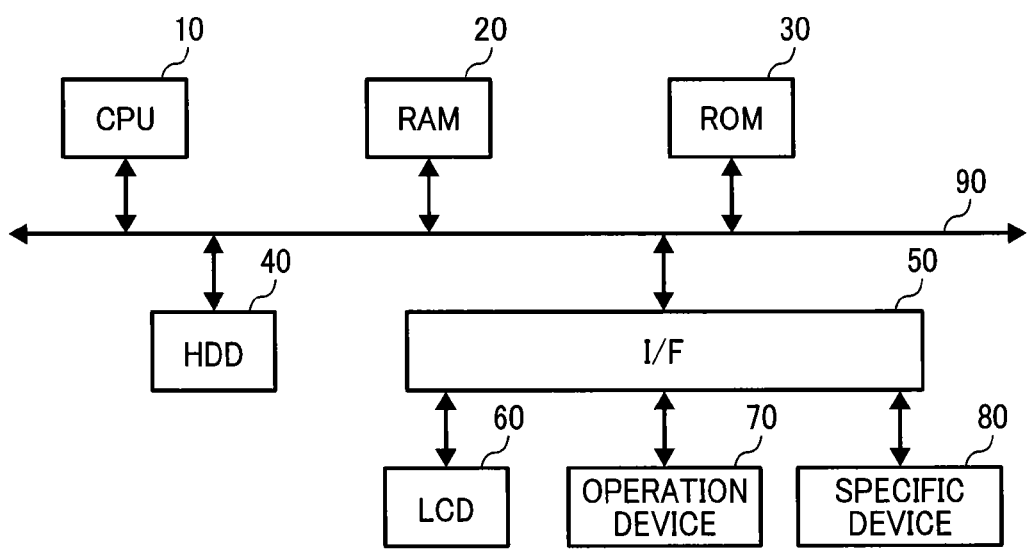
FIG. 2 is a schematic block diagram illustrating a hardware structure of a control section of any one of an engine controller, a print engine, and the inspection apparatus of FIG. 1, according to an exemplary embodiment.

FIG. 2. illustrates a hardware configuration representing any of the engine controller 2, the print engine 3 and the inspection apparatus 4 according to an exemplary embodiment. Further, as for the inspection apparatus 4, components for a scanner and printer may be added to the hardware configuration shown in FIG. 2.

As shown in FIG. 2, the inspection apparatus 4 can be configured similarly to information processing apparatuses such as general servers, and personal computers (PC), or the like. Specifically, the inspection apparatus 4 includes a central processing unit (CPU) 10, a random access memory (RAM) 20, a read only memory (ROM) 30, a hard disk drive (HDD) 40, and an interface (I/F) 50, each connectable to each other via a bus 90. Further, the I/F 50 is connectable to a liquid crystal display (LCD) 60, an operation unit 70, and a specific device 80.

The CPU 10 is implemented by circuitry or a processor, such as a microprocessor, which is capable of controlling the entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS) and application programs such as the inspection control program.

The I/F 50 allows various hardware devices to be connected through the bus 90 or to the outside through a network, and controls these connections. The LCD 60 functions as a user interface, which allows a user to visually check status of the inspection apparatus 4. The operation device 70 functions as a user interface, which allows the user to input various data to the inspection apparatus 4 using, for example, an input device such as a keyboard or a mouse. The LCD 60 and the operation device 70 may be integrated into one device, for example, in the form of a touch panel screen.

The specific device 80 may be disposed as hardware which can perform a specific capability or function for each of the engine controller 2, the print engine 3 and the inspection apparatus 4. For example, as for the print engine 3, the specific device 80 may be a plotter to conduct an image forming operation on sheets and/or a scanner to scan images output on the sheets. Further, as for the engine controller 2 and the inspection apparatus 4, the specific device 80 may be a specific calculating circuit to conduct high speed image processing and/or an application specific integrated circuit (ASIC).

In the above hardware configuration, software programs stored in a storage area such as the ROM 30, the HDD 40, or an optical disk can be read and loaded to the RAM 20 for use by the CPU 10. Accordingly, the CPU 10 runs such programs to control various units which could configure a software-executing controller. Using a combination of such software-executing controller and hardware, a functional block to operate the engine controller 2, the print engine 3 and the inspection apparatus 4 can be configured. In an exemplary embodiment, at least one of the units is implemented as hardware and/or as a combination of hardware and/or software.

Figure 3:
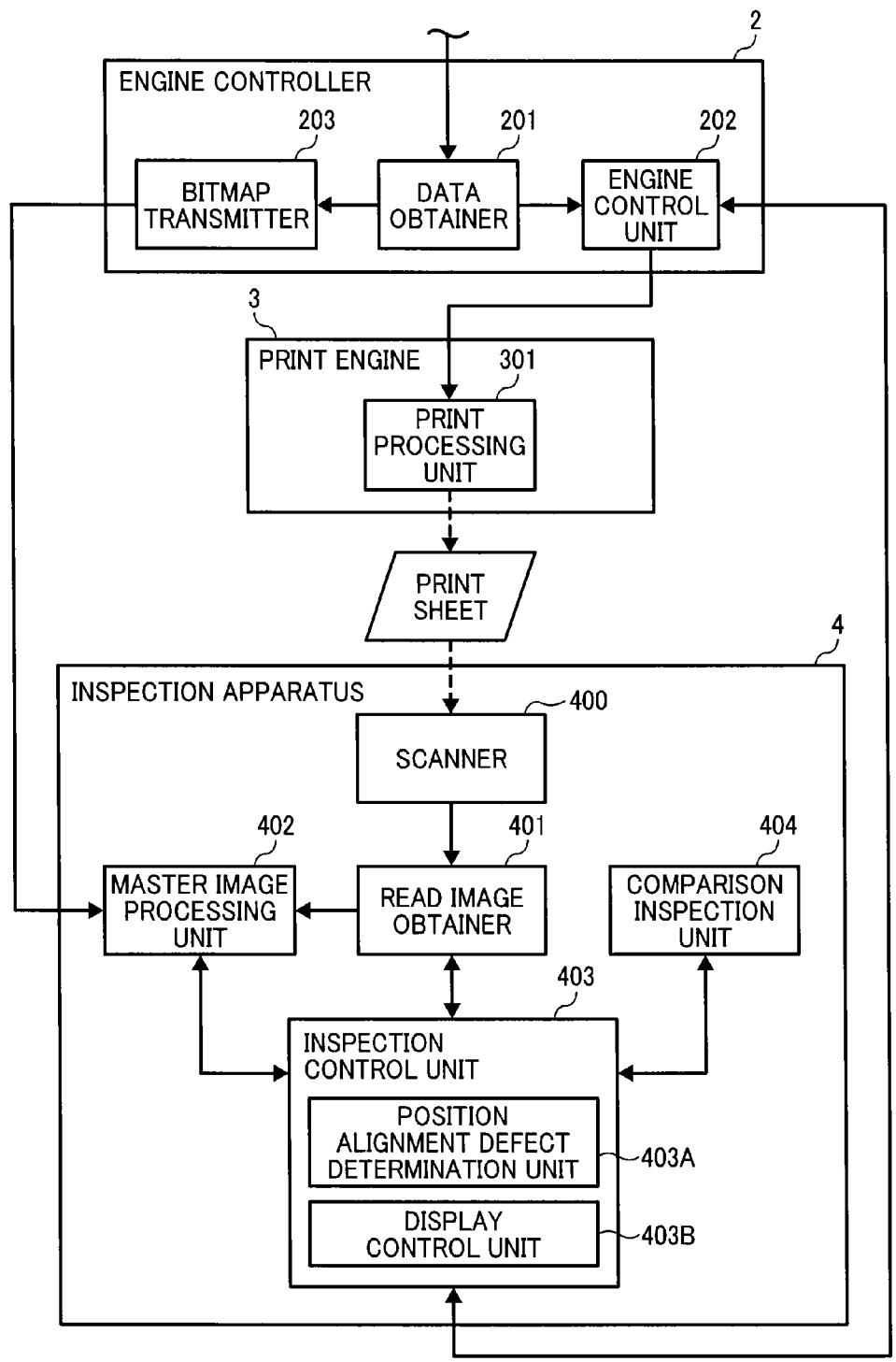
FIG. 3 shows an example block diagram of an engine controller, a print engine and an inspection apparatus according to an exemplary embodiment.

FIG. 3 shows an example block diagram of the engine controller 2, the print engine 3 and the inspection apparatus 4. In the FIG. 3, the solid lines show the data, and the dashed lines show the flow of the recording sheets. As shown in FIG. 3, the engine controller 2 includes, for example, a data obtainer 201, an engine control unit 202 and a bitmap transmitter 203. Further, the print engine 3 includes, for example, a print processing unit 301. Further, the inspection apparatus 4 includes, for example, a read image obtainer 401, a master image processing unit 402, an inspection control unit 403 and a comparison inspection unit 404.

Upon obtaining the bitmap data from the DFE 1 by the data obtainer 201, the engine control unit 202 and the bitmap transmitter 203 execute their respective operations. The bitmap data is information of pixels composing an image that is to be output by an image forming operation. The data obtainer 201 can function as a pixel information obtainer. Based on the bitmap data transferred from the data obtainer 201, the engine control unit 202 instructs the print engine 3 to conduct an image forming operation of the bitmap data such that the engine control unit 202 functions as an output execution control unit. The bitmap transmitter 203 also transmits the bitmap data, obtained by the data obtainer 201, to the inspection apparatus 4 via the master image processing unit 402.

The print processing unit 301 obtains the bitmap data input from the engine controller 2, conducts an image forming operation which transfers the image onto a sheet, and outputs a corresponding printed sheet. Therefore, the print processing unit 301 can function as an image forming apparatus. The print processing unit 301 can use any type of image forming mechanism including, for example, electrophotography, the inkjet method, or the like.

A scanner 400 scans an image formed on the printed sheet by conducting a printing operation by the print processing unit 301 and then outputs read data. The scanner 400 is, for example, a line scanner disposed along a transport route of the printed sheet output by the print processing unit 301, in which the scanner 400 scans the transported sheet face to read an image formed on the sheet. The read image read by the scanner 400 is an inspection target inspected by the inspection apparatus 4. Because the read image corresponds to the image formed on the sheet face of the printed sheet, it becomes the image indicating the output result.

The read image obtainer 401 obtains the read image generated by scanning the sheet face via the scanner 400 of the inspection apparatus 4. However, in selected embodiments, the scanner 400 may be part of the print engine 3. The read image obtainer 401 outputs the read image as an inspection target image to the inspection control unit 403. The inspection control unit then outputs the read image data to the comparison inspection unit 404.

As described above, the master image processing unit 402 obtains the bitmap data input from the engine controller 2 and generates the master image as an inspection reference image to be compared with the inspection target image. Therefore, based on the output-target image, the master image processing unit 402 is used as an inspection reference image generator that generates the master image as the inspection reference image to be used for inspecting the read images. In addition to the generation of the master image in a master image generation process by the master image processing unit 402, the master image processing unit 402 also extracts a reference point for position alignment with the read image and the master image. The master image processing unit 402 also outputs the master image to the inspection control unit 403.

The inspection control unit 403 controls the inspection apparatus 4 as a whole, and each unit of the inspection apparatus 4 is operated under the control of the inspection control unit 403. Moreover, the inspection control unit 403 contains a position alignment defect determination unit 403A and a display control unit 403B. The comparison inspection unit 404 is an image inspection unit that compares the read image data and the master image to determine whether a desired image forming operation has been conducted. The comparison inspection unit 404 may be configured with the above mentioned ASIC or the like to calculate a great amount of data with high speed processing. In this embodiment, the inspection control unit 403 functions as an image inspection part by controlling the comparison inspection unit 404. Also, in exemplary embodiments, the inspection control unit 403 may function as an inspection result acquisition part which obtains the inspection result via the comparison inspection unit 404.

Figure 4:
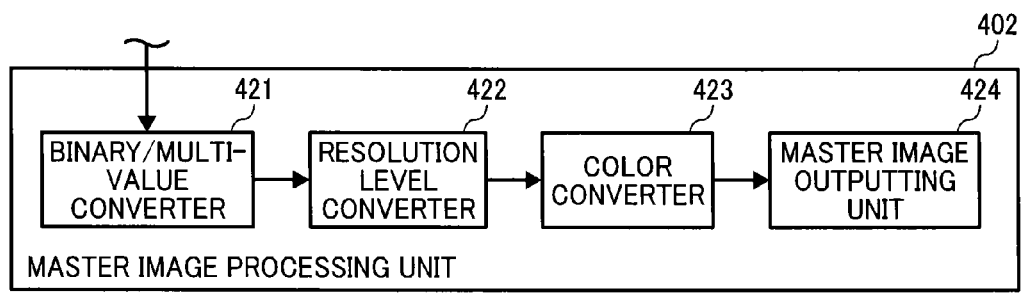
FIG. 4 shows a block diagram of a master image processing unit according to an exemplary embodiment.

FIG. 4 illustrates an exemplary block diagram of the master image processing unit 402. As shown in FIG. 4, the master image processing unit 402 includes, for example, a binary/multi-value converter 421, a resolution level converter 422, a color converter 423 and an image outputting unit 424. The master image processing unit 402 can be implemented as the specific device 80 (see FIG. 2) via a combination of hardware and/or software such as the ASIC controlled by software. The comparison inspection unit 404 and the master image processing unit 402 can also be configured using the ASIC as described above. The comparison inspection unit 404 and the master image processing unit 402 can also be configured using a software module executable by the CPU 10.

The binary/multi-value converter 421 conducts a binary/multi-value converting process to a binary format image expressed in a binary format, such as color/non-color, to generate a multi-valued image. The bitmap data is information input to the print engine 3. The print engine 3 conducts an image forming operation based on a binary format image, such as the bitmap data input to the print engine 3, for each color of cyan, magenta, yellow, black (CMYK). Because the scanned image data generated based on the bitmap data input to the print engine 3, which is the inspection target image, is a multi-valued image composed of multi-gradient image of the three primary colors of red, green and blue (RGB), a binary format image of the bitmap data input into the master image processing unit 402 from the bitmap transmitter 203 is initially converted to a multi-valued image by the binary/multi-value converter 421. The multi-valued image is, for example, an image expressed by 8-bit for each CMYK. However, it should be noted that when the print engine 3 conducts an image forming operation based on a multi-valued image, operation of the binary/multi-value converter 421 can be omitted.

The resolution level converter 422 conducts a resolution level conversion process to match a resolution level of the multi-valued image generated by the binary/multi-value converter 421 to a resolution level of the scanned image data (i.e., inspection target image). Because the scanner 400 generates scanned image data, for example, with the resolution level of 200 dots per inch (dpi), the resolution level converter 422 converts a resolution level of the multi-valued image generated by the binary/multi-value converter 421 to 200 dpi.

The color converter 423 receives the image which has had its resolution level converted by the resolution level converter 422 and conducts a color converting process. Because the scanned image data is RGB-format image as described above, the color converter 423 converts the CMYK-format image having a resolution level converted by the resolution level converter 422 to the RGB-format image, such that a multi-valued image of 200 dpi expressed with 8-bit for each of RGB (total 24 bits) for each pixel is generated. That is, in this embodiment, the binary/multi-value converter 421, the resolution level converter 422, and the color converter 423 function as an inspection reference image or master image generator based on the bitmap data received from the engine controller 2.

The image outputting unit 424 performs a variable magnification process with respect to the RGB 8-bit, 200 dpi image formed by and received from the color converter 423. Accordingly, the inspection apparatus 4 can match a size of the read image received from the scanner 400 and the master image generated by the master image processing unit 402 such that the position shift of an image can be reduced.

Figure 5A:
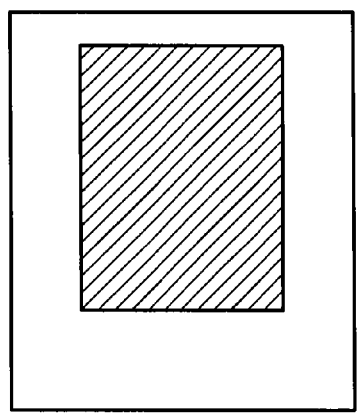
FIGS. 5A and 5B illustrate an operation of extracting corners of the image as a reference point according to an exemplary embodiment.
Figure 5B:
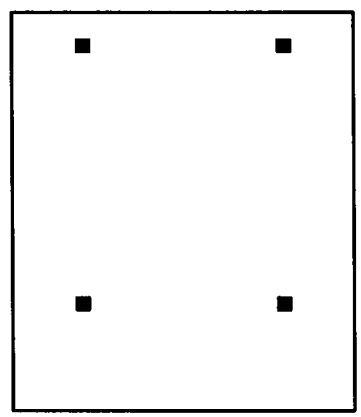

Further, the image outputting unit 424 extracts a reference point for performing position alignment with the master image and the read image from the master image to which the variable magnification process was performed. FIG. 5A shows an example of the image on the portion of the page having oblique lines to which the variable magnification process has been performed. FIG. 5B shows example of corners extracted from the image illustrated in FIG. 5A. A corner shown in FIG. 5B may be extracted in selected embodiments by applying a filter with respect to the image shown to FIG. 5A. The corner extracted in this way becomes the reference point for alignment.

The master image processing unit 402 outputs the master image and the extracted reference point to the inspection control unit 403. Further, the inspection control unit 403 then outputs the master image and the extracted reference point received from the master image processing unit 402 to the comparison inspection unit 404.

Next, an operation of comparing the master image and the read image via the comparison inspection unit 404 is explained according to an exemplary embodiment. First, the comparison inspection unit 404 performs position alignment between the master image and the read image using the master image and the reference point received from the inspection control unit 403. For example, the comparison inspection unit 404 determines the position where a computed difference value becomes the smallest with respect to a superimposition of the read image and master image. To make this determination, the comparison inspection unit 404 superimposes a predetermined segmented range/division range or square of pixels in a portion of the read image over the same range of pixels on the master image by centering the segmented range at a position based on the reference point. A computer difference value is then determined based on a comparison between the pixels of the master image and read image. The position of superimposition of the segmented range of the read image on the master image is then shifted either vertically or horizontally in four directions by a predetermined number of pixels within the segmented range while centering on the reference point (for example, in a range of a square of 10 pixels of four-directions, the range of the read image is 21 pixels×21 pixels. Such a process performs position alignment with the read image and the master image o identify a "preliminary position alignment." That is, the comparison inspection unit 404 functions as a position alignment unit which performs position alignment between the read image and the master image.

The comparison inspection unit 404 then superimposes the read image and the master image at the determined position of alignment and compares each corresponding pixel of the 200 dpi read image with the 200 dpi master image. Accordingly, the comparison inspection unit 404 calculates, for each pixel, the difference value of the pixel value of 8 bits of RGB for each color discussed above. The inspection control unit 403 then determines the presence or absence of a defect in the read image based on a comparison of the calculated difference value to a threshold value.

Figure 6:
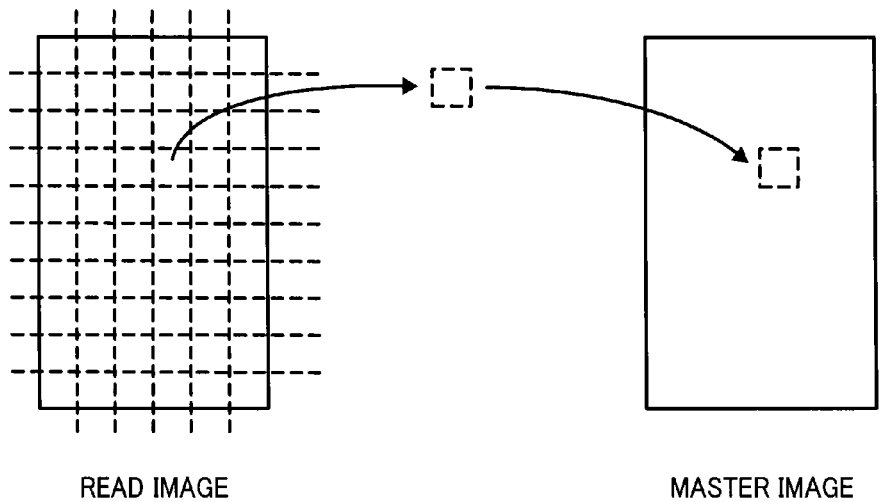
FIG. 6 illustrates a process of comparing images for inspection according to an exemplary embodiment.

When comparing the read image with the master image, the comparison inspection unit 404 superimposes the read image segmented in a predetermined range on a corresponding segmented range of the master image as illustrated in FIG. 6 to calculate the difference of pixel values, that is, any difference values of the intensity between the pixels. The comparison inspection unit 404 then shifts the segmented range in the read image in the vertical and horizontal directions to be superimposed on a corresponding area in the master image to determine the position where the calculated difference value is the smallest. This position represents a correct superimposed position such that by using the above processing, the position of the master image with respect the position of the read image can be matched in detail. Henceforth, this process is defined as "detailed position alignment."

By the above processing, the comparison inspection unit 404 matches the position of the master image to the position of the read image to calculate the difference value. At this time, the comparison inspection unit 404 also outputs a deviation amount of the height and width as a position of detailed position alignment with respect to the difference value of each pixel. As a result, the comparison inspection unit 404 can obtain a deviation amount G of the height and width of the master image and a read image, that is, a deviation amount G of a main scanning direction and a sub-scanning direction, for divided range.

Accordingly, computational complexity can be reduced as a whole by computing the difference value for every segmented range rather than computing the difference value by superimposing the whole read image on top of the whole master image. Furthermore, even if a reduced scale has a difference over the whole read image and the whole master image, it is possible by aligning for every divided range, as shown in FIG. 6 to reduce the influence of the difference in a reduced scale.

In addition, the inspection control unit 403 compares the difference value computed by the comparison inspection unit 404 for each pixel with the threshold value which can be preset for the comparison method of the relationship of sizes between the difference value and the threshold value. Thereby, the inspection control unit 403 acquires information identifying whether the difference between the master image and the read image exceeded the predetermined threshold value for each pixel of every shift as a comparison result. That is, the inspection control unit can inspect whether a defect has occurred for each pixel of the read image. Moreover, the size of each segmented or divided range shown in FIG. 6 is determined based on a range with which the comparison inspection unit 404 can compare a pixel value at once with the ASIC mentioned above.

Moreover, in the selected embodiments, the comparison inspection unit 404 computes and outputs the difference value between pixels of the master image, and pixels of the read image and performs threshold comparison. Accordingly, the comparison inspection unit 404 can obtain a result of the comparison with the difference value and the threshold value and provide the result to the inspection control unit 403.

In addition, in selected embodiments and as described above referring to FIG. 6, when the comparison inspection unit 404 superimposes the read image segmented in the predetermined range on the master image corresponding to the segmented range and shifts a position where the read image segmented in the predetermined range is superimposed to calculate the difference of pixel values, On the other hand, in selected embodiments, the process which shifts the position at which the read image is superimposed on top of the master image for every division range may be omitted, and an aspect which performs the process which computes the difference value one time for each division range is considered. In this case, it is necessary to consider the deviation amount for every division range which arises according to the difference in the reduced scale with the master image and the read image, and to perform the comparison process for each division range.

For example, as described above referring to FIG. 5, based on the deviation amount corresponding to the reference point extracted for every range, an aspect which calculates the deviation amount of a range can in the meantime be considered. That is, when the deviation amount calculated in an area within the superimposed division range of the read image is (X, Y)=(+1, +3) and the deviation amount calculated in an other area is (X, Y)=(+3, +5), the average deviation amount in an area in the meantime can be calculated as (X, Y)=(+2, +4).

In addition, in a selected embodiment as described above, when the reference point as shown in FIG. 5 is extracted, a preliminary position alignment based on the predetermined range centering on the extracted reference point was described. However, in other selected embodiments, preliminary position alignment may be performed based on the predetermined range of a predetermined position without extracting the reference point.

Moreover, the segmented/division range used for position alignment may be designated by the user.

Moreover, preliminary position alignment may not be performed based on the predetermined range centering on the reference point but may be performed based on the reference point. In that case, the image outputting unit 424 extracts the reference point from the read image by corner extraction similar to that performed on the master image and the comparison inspection unit 404 compares the reference point extracted from both the read image and master image. The comparison inspection unit 404 then performs alignment so that the position of one reference point may be aligned with the position of the other reference point.

Figure 7:
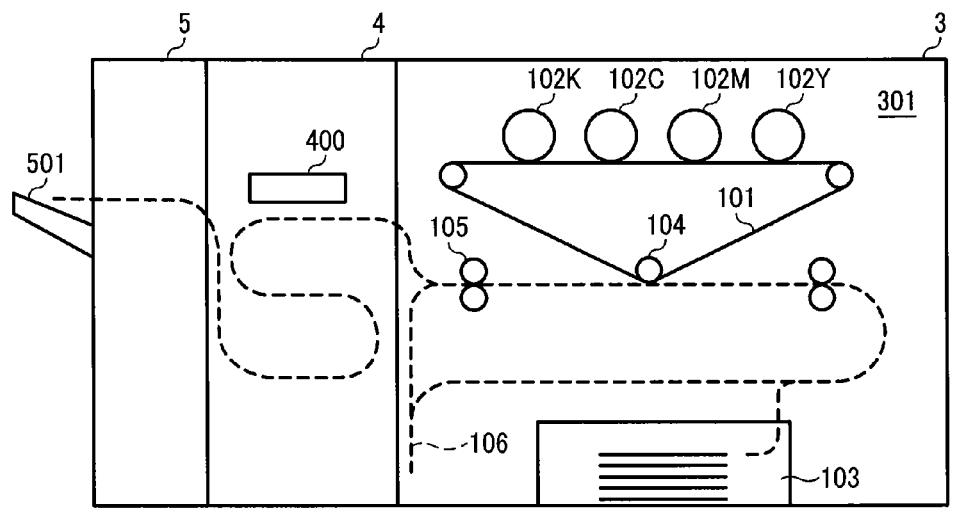
FIG. 7 illustrates a schematic mechanical configuration of a print processing unit according to an exemplary embodiment.

The image inspection system of FIG. 7 may be implemented by a system including a print engine 3, an inspection apparatus 4, and a stacker 5. The print engine 3 may be implemented as a tandem-type image forming device. More specifically, in selected embodiments, the print engine 3 includes a plurality of photoconductive drums 102Y, 102M, 102C, and 102K (collectively referred to as the photoconductive drum 102), which are disposed side by side along a transfer belt 101 in a direction upstream from the sheet transfer direction. The transfer belt 101 is an intermediate transfer belt such that an intermediate transfer image can be transferred onto a recording sheet fed by a sheet feeding tray 103. In operation, the toner images of the respective colors, which are formed on the surfaces of the photoconductive drums 102, are transferred to the transfer belt 101 one above the other to form the full-color toner image.

The full-color toner image formed on the transfer belt 101 is conveyed to a transfer position between a transfer roller 104 and a sheet transfer path (indicated by the doted line). At the transfer portion, the full-color toner image is transferred from the transfer belt 101 to the recording sheet by being transferred through the sheet transfer path by a plurality of transferring roller 104.

The recording sheet having the full-color toner image formed thereon is further conveyed to a fixing roller 105. The fixing roller 105, together with a pressure roller, fixes the toner image onto the recording sheet by heat and pressure. The recording sheet is then conveyed to the inspection apparatus 4. In case of printing double-sided images, the recording sheet having one side with the fixed toner image is conveyed to a switchback path 106 and transferred back to the transfer roller 104 to receive another image on the other side of the recording sheet.

In the conveyance route of the paper, the scanner 400 reads each surface of the paper conveyed from the print processing part 301, and outputs it to the read image obtainer 401 of the inspection apparatus 4 which forms a read image. Moreover, the paper in which the paper surface was read is further conveyed in the inspection apparatus 4 to the stacker 5, and is ejected at the paper delivery tray 501. In addition, in FIG. 7, the case where the scan is provided only on the single surface side of a paper is illustrated in the conveyance route of the paper in the inspection apparatus 4. However, since the inspection of both surfaces of a paper may be enabled, the scan may also be made for positioning both surfaces of a paper, respectively.

It may be possible that the image outputting unit 424 does not extract the reference point suitable for position alignment such that alignment may become inadequate in the comparison inspection unit 404. If position alignment is inadequate, when the comparison inspection of a read image and a master image is performed a shift may have inappropriately arisen in the comparison area of the read image and the master image. Therefore, in spite of being printed normally, the comparison inspection unit 404 may determine that there is a defect in the printed matter. In such a case, providing a notification based on the inspection result and indicating that the defect originates from a defect in the position alignment rather than in the printed matter becomes important as described further herein.

Figure 8:
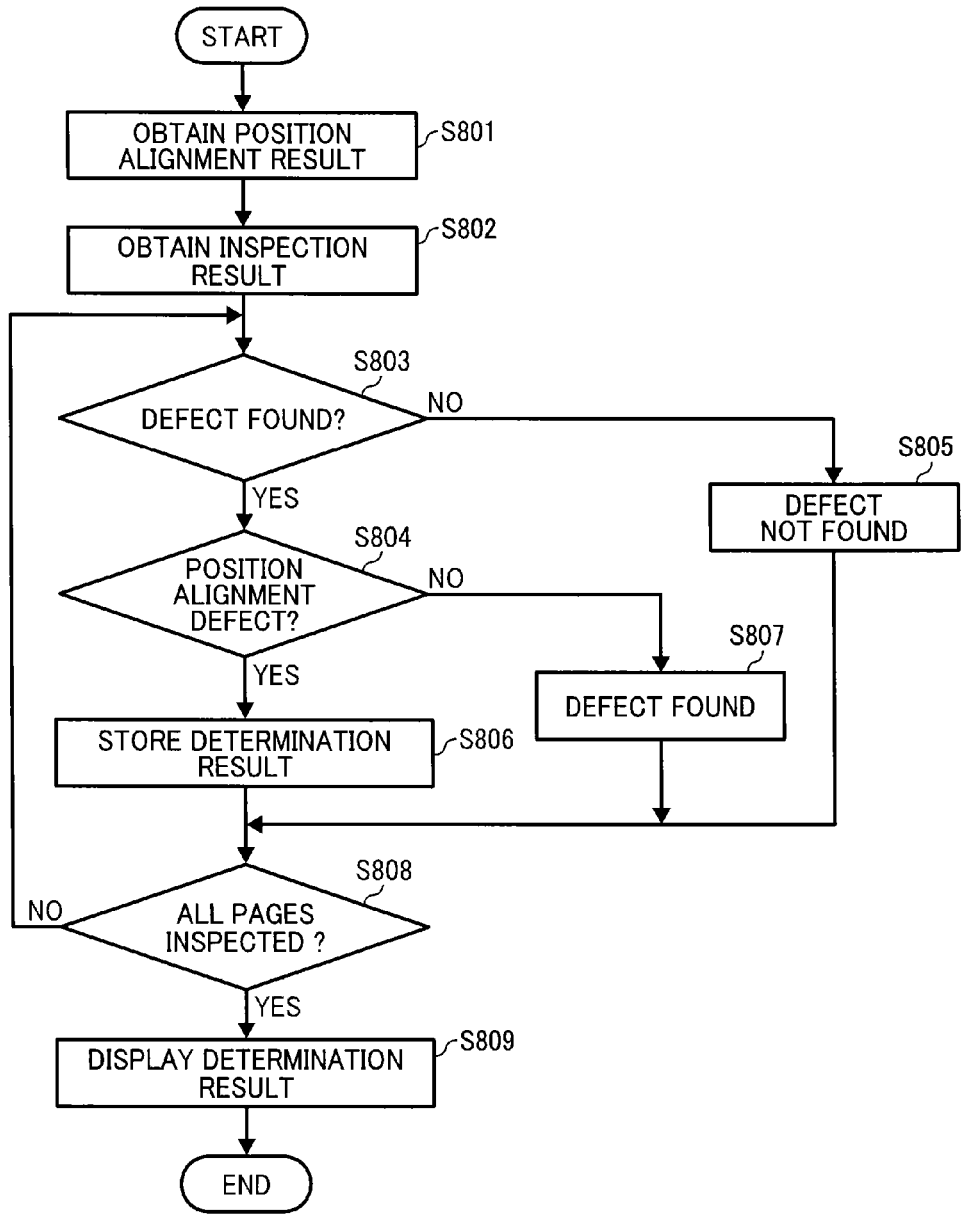
FIG. 8 is a flowchart of the defect determination process which considers the position alignment defect according to an exemplary embodiment.

FIG. 8 is a flowchart which illustrates the defect determination process which takes into consideration the position alignment defect according to an exemplary embodiment. As shown in FIG. 8, after the inspection by the comparison inspection unit 404 is completed, the inspection control unit 403 obtains a position alignment result from the comparison inspection unit 404 (S801). Each difference value computed while having the position shifted by the comparison inspection unit 404 which superimposes the range of a predetermined square centering on the reference point on the master image vertically and horizontally is included in the position alignment result at the time of the preliminary position alignment process.

Next, the inspection control unit 403 obtains the inspection result from the comparison inspection unit 404 (S802). Each difference value computed in order to determine a page number on which printed matter was printed, the presence or absence of a defect and positional shift amounts G for every division area computed during the detailed position alignment process are contained in the inspection result.

When the position alignment result and the inspection result are received by the inspection control unit 403 from the comparison inspection unit 404, the position alignment defect determination unit 403A determines the presence or absence of the defect of each page in order based on the data from the obtained inspection result (S803). When it is determined that a defect exists (S803/YES), the position alignment defect determination unit 403A determines whether a position alignment defect has occurred to the page (S804) (a specific example of the determination method of a position alignment defect is mentioned later). On the other hand, when it is determined that defect does not exist (S803/NO), the position alignment defect determination unit 403A stores the determination result indicating the page that does not have a defect in at least one of the RAM20, HDD40, ROM 30 or other storage device of the inspection apparatus 4 (S805).

When the position alignment defect determination unit 403A determines that a position alignment defect has been detected (S804/YES), the determination result identifying the defect existence owing to a position alignment defect is stored in at least one of the RAM20, HDD40, ROM30 or other storage device of the inspection apparatus 4*by* the position alignment defect determination unit 403A (S806). On the other hand, when the position alignment defect determination unit 403A determines that a position alignment defect has not occurred (S804/NO), it is determined that the page of the read image has a defect itself and the determination result is stored in at least one of the RAM20, HDD40, ROM30 or other storage device of the inspection apparatus 4 by the position alignment defect determination unit 403A (S807).

The position alignment defect determination unit 403A then determines whether defect detection has been performed with respect to all the pages contained in the obtained inspection result (S808). If YES at S808, the display control unit 403B displays at S809 the stored determination result on LCD60 of the inspection apparatus 4, and the process ends. On the other hand, when any pages to which the determination regarding a position alignment defect has not been performed remain (S808/NO), the position alignment defect determination unit 403A performs the determination regarding a position alignment defect for each remaining page (S803-S807).

Figure 9:
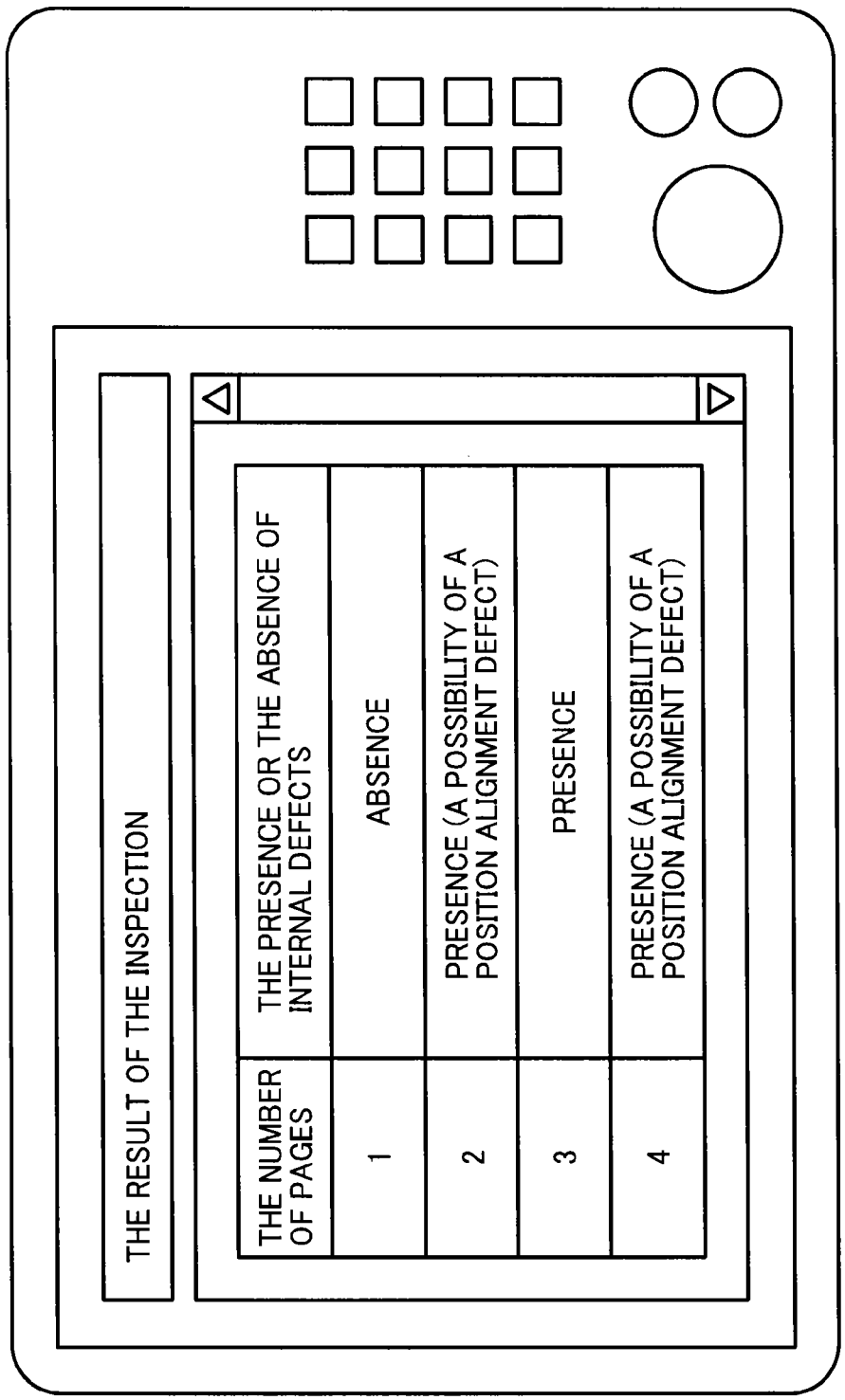
FIG. 9 illustrates a display screen which displays the defect determination result according to an exemplary embodiment.

FIG. 9 illustrates examples of the display screen, which displays the defect determination result indicating a position alignment defect detected by the position alignment defect determination unit 403A. As shown in FIG. 9, the defect determination result, for example, the presence or absence of a defect for every page is displayed on LCD60 of the inspection apparatus 4 by the display control unit 403B. For example, as shown in FIG. 9, as for the first page, a defect was not detected, but, as for the second to fourth pages, a defect was detected by the comparison inspection unit 404. Further, for the second page and the fourth page, the display control unit 403B causes the LCD60 to display that there exists the possibility of a position alignment defect. Moreover, with respect to a page having the possibility of a position alignment defect, the display control unit 403B may cause the LCD60 to display that the inspection result has been suspended.

Next, specific examples of the determination method of the position alignment defect are described. For example, the method of providing and determining the threshold value with respect to each difference value computed for the preliminary position alignment process is described. As discussed herein, the position where the difference value computed becomes the smallest is determined as the position of the superimposition of the read image and the master image. However, with respect to the computed difference value, even if it is below the minimum threshold value, it may still be determined that position alignment is not performed correctly if the minimum value is too large.

The position alignment defect determination unit 403A sets the threshold value with respect to the difference value. Then, when the difference value determined as a position of a superimposition is larger than the set threshold value, position alignment is not performed correctly and the position alignment defect determination unit 403A determines the existence of a position alignment defect.

Further, in selected embodiments, one method is to determine alignment errors based on whether there exist two or more difference values which show the minimum value among each difference value computed for the preliminary position alignment process. As mentioned above, the position where the computed difference value becomes the smallest is determined as the position of superimposition of the read image and the master image. However, there may not be an appropriate position of superimposition when there exist plural difference values which show the minimum value and one of the plural difference values is selected and the position corresponding to the value is determined as the position of the superposition.

Moreover, when the extraction of the reference point used for position alignment is not performed appropriately, the position of the superimposition may not become settled which may cause the position alignment defect. Then, the position alignment defect determination unit 403A determines with the position alignment defect having occurred, when plural difference values exist which show the minimum value among each difference value.

Moreover, another example of determining position alignment defects is a method of determination based on the positional shift amount G A shift direction and a gap are contained in the positional shift amount G and the positional shift amount G is calculated for every division range of a read image. Therefore, when judged by the whole read image, it will be thought that there exists the same shift direction and a fixed tendency of the same gap in each shift direction and gap of the positional shift amount G. Accordingly, the position alignment defect determination unit 403A determines that a position alignment defect has occurred when the positional shift amount G exists that does not correspond to the fixed tendency.

Furthermore, another example is the method of setting and determining the threshold value determined with respect to the difference value computed for the detection of the defect by the comparison inspection unit 404 to be a position alignment defect. When position alignment is inadequate, the read image is compared with the master image in shifted state where there may be an inappropriately large shift. Therefore, it is thought that the computed difference value becomes larger than the difference value at which the defect was detected in the state in which alignment was correctly performed.

Then, the position alignment defect determination unit 403A sets the threshold value to be a larger value than the threshold value used when detecting a defect. Accordingly, a first threshold may be used to determine position alignment and a second threshold, larger than the first threshold, may be used to determine the existence of a defect. When the difference value of the read image and the master image is larger than the set threshold value, it determines with that a position alignment defect has occurred. In addition, the threshold value may be set not with respect to the difference value for every division range but with respect to the total value of the difference value for every division range.

In selected embodiments and as explained above, the cause of the defect with respect to the printed matter in which the defect was detected identifies with respect to the defect page whether the defect is on the printed matter or was based on a position alignment. Thereby, the user can distinguish between printed matter which actually has a defect and printed matter having a defect originating from a position alignment defect. Since the user can only confirm the printed matter having a position alignment defect, the user's confirmation responsibility is eased.

Accordingly, in selected embodiments, printed matter which actually has a defect and printed matter having a defect based on a position alignment can be distinguished. Furthermore, the structure which reexamines the presence or absence of a defect is described in the following with respect to printed matter having a position alignment defect.

Figure 10:
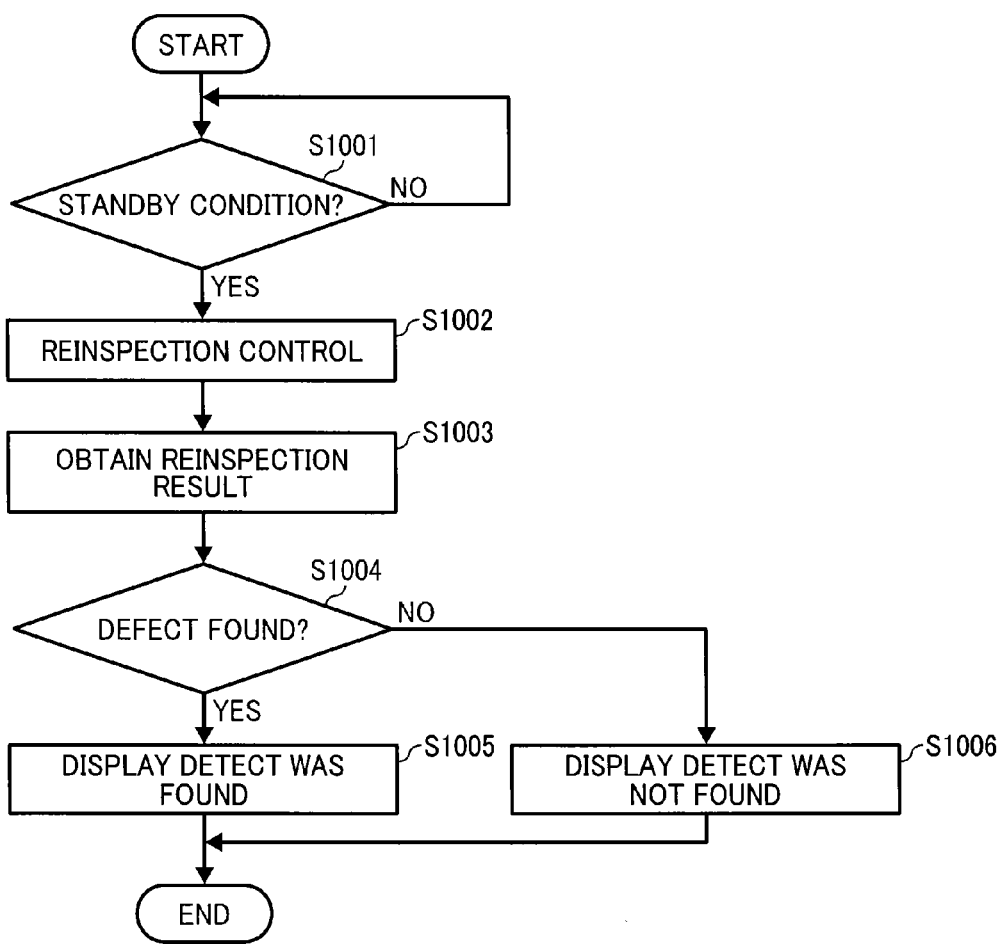
FIG. 10 illustrates a flowchart of the process of reinspecting for the presence or absence of the defect with respect to the printed matter originating in the position alignment defect according to an exemplary embodiment.

FIG. 10 is a flowchart which illustrates the process which reinspects the presence or absence of the defect with respect to the printed matter determined to be from a position alignment defect by the position alignment defect determination unit 403A. The position alignment defect determination unit 403A stores the identification information etc. which identifies the page at which the position alignment defect has occurred by the process as shown in FIG. 8 in at least one of the RAM20, HDD40, ROM30 or other storage area of the inspection apparatus 4.

Next, as show in FIG. 10, when the image formation system shown in FIG. 1 is in a standby state (S1001/YES), the position alignment defect determination unit 403A inputs the identification information of the page of a reinspection object with respect to the comparison inspection unit 404 to control reexamination to determine the presence or absence of the defect (S1002). That is, the comparison inspection unit 404 functions as a reinspection unit which performs the reinspection process of a reinspection object on a page during the standby state of an image formation system. The image formation system being in a standby state shows the state of the print engine 3 such as the image formation system not carrying out image formation output and/or a state during which the inspection apparatus 4 is not carrying out the inspection process.

Moreover, during reinspection of the presence or absence of a defect, for example, the comparison inspection unit 404 extends the range which shifts an image vertically and horizontally in the case of the defect inspection of the read image and the master image with respect to the first inspection, each difference value is calculated, and in order to extract a reference point suitable for position alignment, the comparison inspection unit 404 may use another method (for example, phase limited correlational method). The computation time in which such a reinspection process is performed is longer than the inspection process of the presence or absence of the defect. However, since the reinspection process is carried out in the standby state which has allowances in the resource of an image formation system, there are no restrictions in processing time, and it is carried out without being closed in the middle of a process.

On the other hand, when an image formation system is not a standby state (S1001/NO), the position alignment defect determination unit 403A waits until it will be in a standby state. The position alignment defect determination unit 403A performs reexamination based on an inspection results obtained from the comparison inspection unit 404 (S1003). When the reinspection result shows the presence of the defect, the display control unit 403B causes this information to be displayed on LCD60 of the inspection apparatus 4 (S1005). That is, it is determined that there exists a defect in the printed matter.

On the other hand, when the reinspection result does not identify a defect (S1004/NO), the display control unit 403B causes the LCD60 etc., of the inspection apparatus 4, to display the absence of the defect (S1006). That is, it is confirmed that a defect does not exist in the printed matter.

Figure 11:
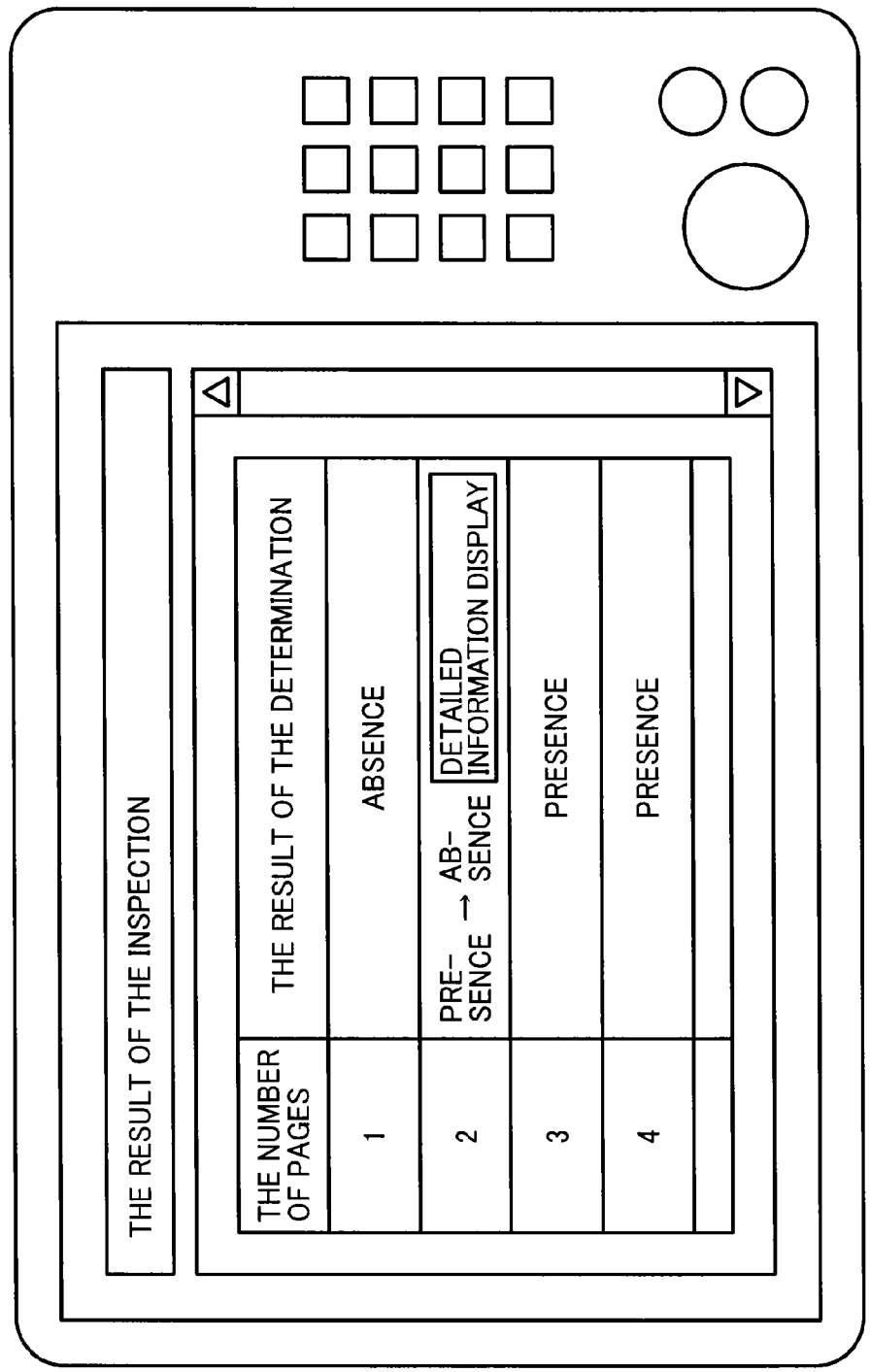
FIG. 11 illustrates a display screen which displays the defect determination result after the reinspection according to an exemplary embodiment.

FIG. 11 illustrates an example of the display screen which displays the defect determination result after the reinspection by the comparison inspection unit 404. For example, the second page and the fourth page of the defect determination result shown in FIG. 9 are reinspected by the comparison inspection unit 404. And, as shown in FIG. 11, it is displayed that the second page was changed by reinspection from identify the existence of a defect to the non-existence of a defect and a "detailed information display" button is further displayed which displays the changed reason. Moreover, the fourth page is changed via reinspection to display the existence of a defect existence from a display that there existed the possibility of a position alignment defect.

Figure 12:
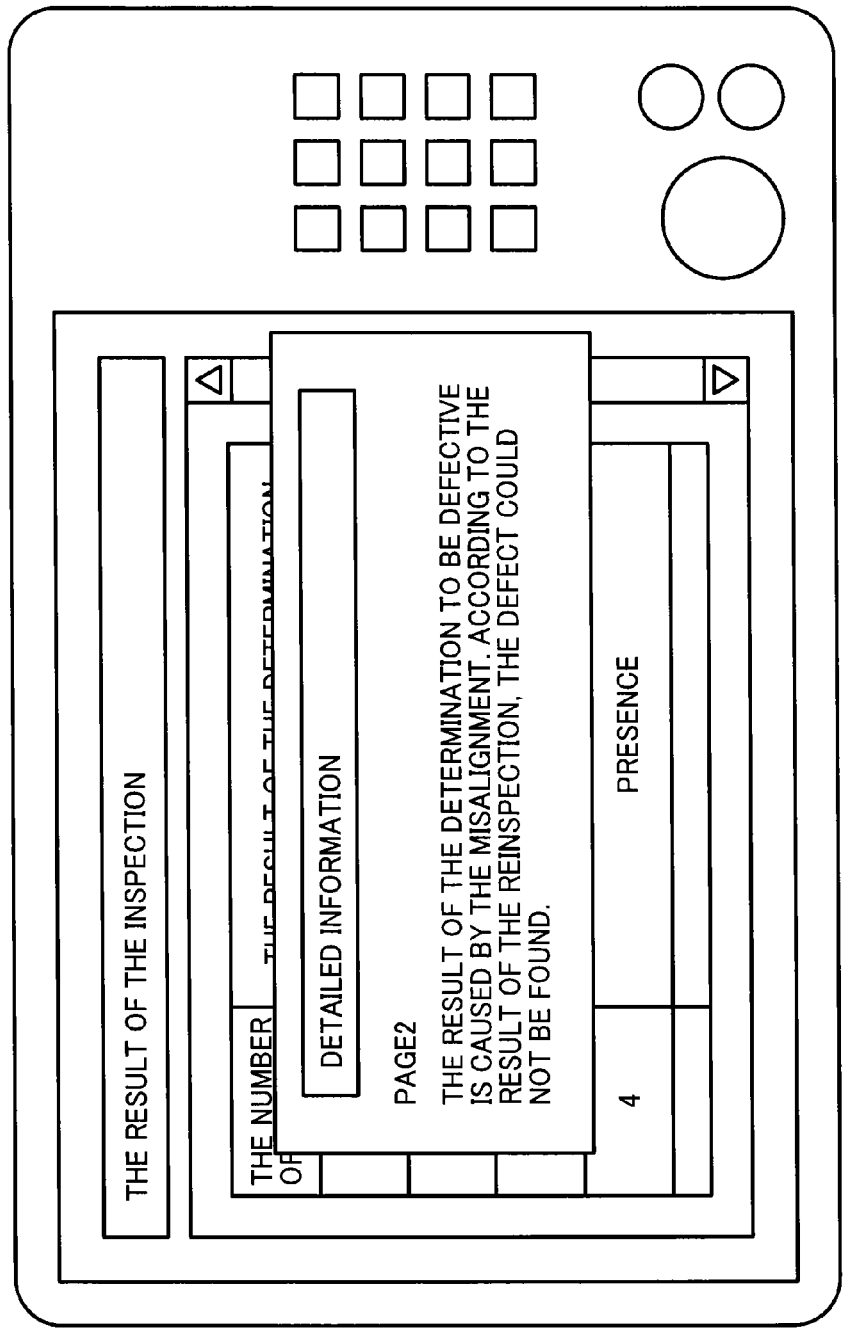
FIG. 12 illustrates a display screen which displays a result of reinspection according to an exemplary embodiment.

FIG. 12 illustrates an example of the display screen, which displays the reason a change was made by reinspection on page two as to the non-existence of the defect. Pressing-down on the "detailed information display" button shown in FIG. 11 will display that although the second page was initially determined to be defective, that after reinspection no defect occurs as the defect existence was based on a position alignment defect.

As noted previously herein, the reinspection process can be performed efficiently without receiving restrictions of processing time as it is performed in the standby state of the image formation system. Therefore, the position alignment defect can be considered and the defect determination with a sufficient reliance precision can be performed. Moreover, the user can refer the result to which defect determination was carried out more accurately. Therefore, printed matter which is called the printed matter determined by the position alignment defect to be defective and which should be confirmed can be reduced, and a confirmation responsibility is eased.

It is noted that the display of the defect determination result and the reinspection result of having considered the position alignment defect as shown in FIG. 9, FIG. 11, FIG. 12 was demonstrated as a specific example. However, the LCD60 can also be made to display the position of the printed matter determined to be defect existence in the printed matter. Further, the position of the printed matter determined to have a position alignment defect may be displayed by augmented reality (AR; Argument Reality) on screens such as screens of a mobile terminal. In addition, mobile terminals are portable information processing terminals, such as a smart phone, a tablet terminal, PDA (Personal Digital Assistants), etc. which have a camera (imaging function) and are connected so as to be communicable with the inspection apparatus 4.

Figure 16:
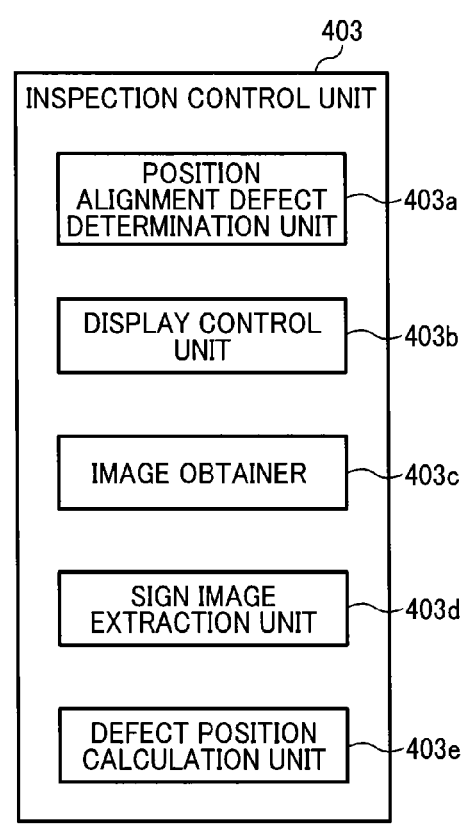
FIG. 16 illustrates an inspection control unit according to an exemplary embodiment.

Moreover, AR is a technique to put a virtual image on an image displayed by a display to display it. FIG. 16 is a block diagram which illustrates the structure of the inspection control unit 403 according to an example embodiment. As shown in FIG. 16, the inspection control unit 403 in this embodiment contains the image obtainer 403c, the marker image extraction unit 403d, and the defect position calculation unit 403e in addition to the structure of the inspection control unit 403 shown in FIG. 3.

Specifically, for example, when the printed matter in which an AR marker (marker image) which are pattern images, such as barcode, was printed and loaded on the loaded inspected printed matter it may be imaged with cameras, such as a mobile terminal, and displayed on the display part of a mobile terminal. Then, the image obtainer 403c obtains the captured image imaged. The marker image extraction unit 403d extracts an AR marker from the obtained captured image. Moreover, the defect position calculation unit 403e computes the loading position of the printed matter determined to be defective and the loading position of the printed matter determined to have a position alignment defect based on the defect determination result by the position alignment defect determination unit 403A which considered the position alignment defect corresponding to the imaged printed matter.

The display control unit 403B then superimposes a line on the printed matter currently displayed on the display part based on the extracted AR marker and the computed loading position, wherein the line shows the loading position of the printed matter determined to be defective and the loading position of the printed matter determined to have a position alignment defect based on the a defect determination result.

Figure 13:
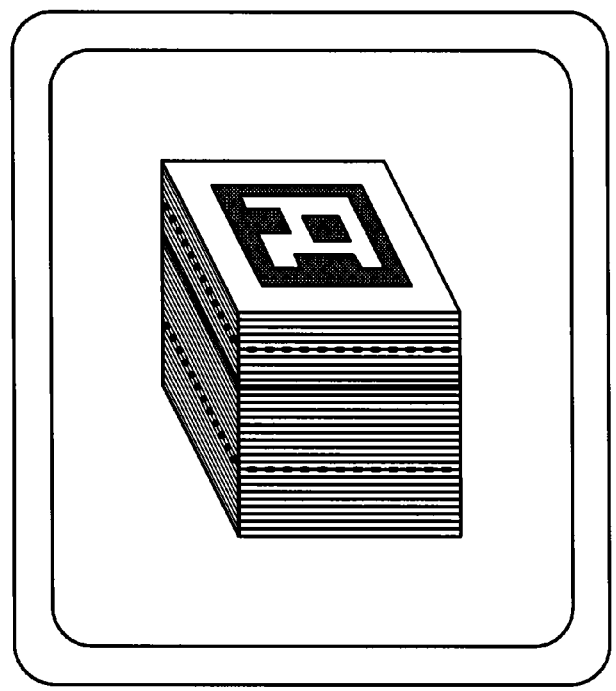
FIG. 13 shows example of the screen which shows the loading position superimposed according to an exemplary embodiment.

FIG. 13 illustrates an example of the screen having the line which shows the loading position superimposed on top of the printed matter currently displayed on the display part of the mobile terminal. As shown in FIG. 13, the line which shows the loading position of the printed matter determined to be defective is a continuous line, and the line which shows the loading position of the printed matter determined to have a position alignment defect is a dotted line. Thus, both printed matter can be displayed so that both printed matter can be distinguished. Moreover, it can distinguish by the color of a line.

Figure 14:
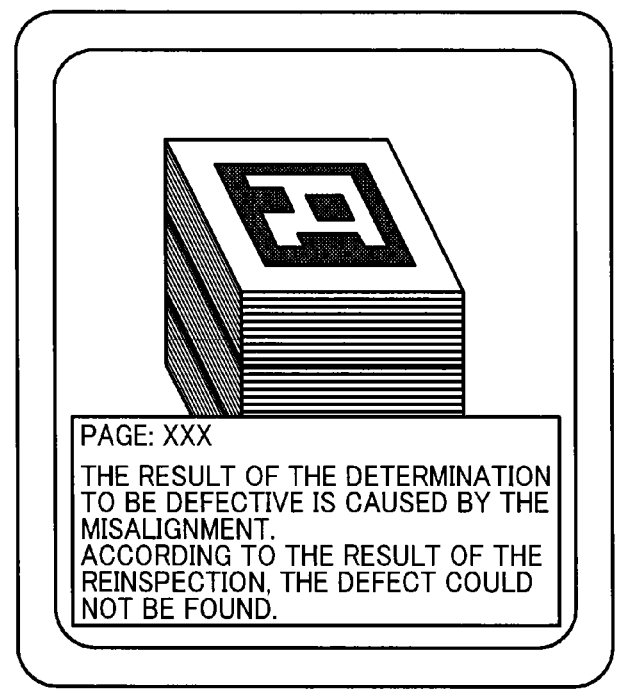
FIG. 14 illustrates a display screen after the reinspection with respect to the printed matter currently imaged according to an exemplary embodiment.

FIG. 14 illustrates an example of the display screen after the reinspection with respect to the printed matter currently imaged. As illustrated in FIG. 14, the line shown in FIG. 13 which shows the loading position of the printed matter changed from the existence of a defect to the non-existence of a defect by reinspection is deleted. Furthermore, as shown in FIG. 14, detailed information, such as a reason for the change may be accumulated and displayed on the display part of a display screen such as mobile terminal display screen. In selected embodiments, the line which shows the loading position of the printed matter changed from the existence of a defect to the non-existence of a defect is not deleted, but the line may be displayed by a different color. As long as the display identifies what has changed like the embodiments listed above, any kind of display method may be used.

Moreover, for example, in the printed matter loaded by the paper delivery tray 501, the loading position of the printed matter determined to be detective and the loading position of the printed matter determined to have a position alignment defect can be displayed by instruction of an instructions unit 502 placed at the stacker 5.

Figure 15:
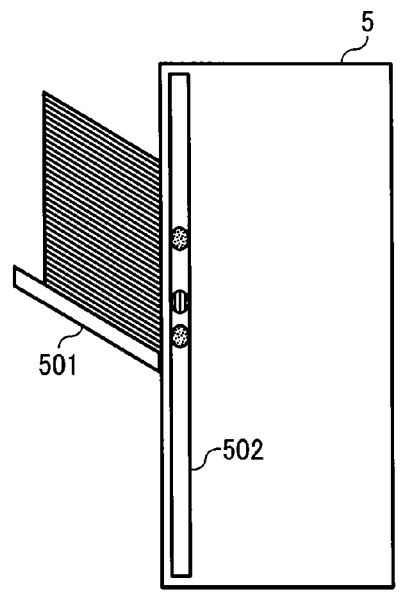
FIG. 15 illustrates a schematic mechanical configuration of a stacker according to an exemplary embodiment.

FIG. 15 is a figure which illustrates the stacker 5 which has an instructions unit 502.

Figure 17:
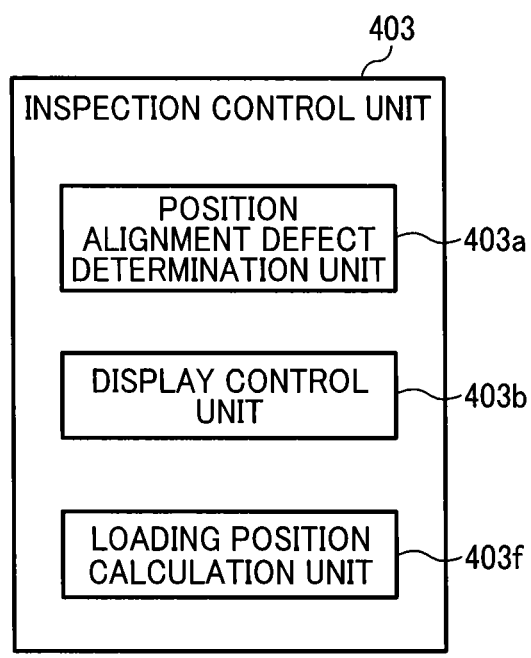
FIG. 17 illustrates an inspection control unit according to an exemplary embodiment.

As specifically, as shown in FIG. 15, the instructions unit 502 includes light emitting elements, such as LED (Light Emitting Diode), placed at a predetermined interval at a perpendicular direction with respect to the loading surface of the paper in the paper delivery tray 501. The instructions unit 502 makes LED light, wherein LED is located at the height where the printed matter is defective and the printed matter having a position alignment detect is loaded on. Thus, the instructions unit 502 points to the loading position of both printed matter with the height of LED. In addition, the loading position of both printed matter is computed by a loading position calculation unit 403F of the inspection control unit 403 shown in FIG. 17, based on the defect determination result by the position alignment defect determination unit 403A which considered the position alignment defect.

As show in FIG. 15, for example, the loading position of the printed matter determined to be defective has an LED illuminated in a color such as red (in FIG. 15, it is pinstriped hatching) and the loading position of the printed matter determined to have a position alignment defect has an LED illuminated in a color such as green (in FIG. 15, it is the hatching of a dot). Thus, defects in printed matter can easily be distinguished. Moreover, defects can distinguished by a blinking pattern of the LEDS, etc.

Moreover, an LED indicating the loading position of the printed matter changed by reinspection from having a defect to not having a defect is put out. Moreover, detailed information, such as a reason changed into defect nonexistence from defect existence, may be displayed on LCD60 etc., of the inspection apparatus 4. Moreover, the LED indicating the loading position of the printed matter changed by reinspection from not having a defect to having a defect may not be put out, but may be lighted by a blink pattern, or, different color changes. As long as it is an aspect which can distinguish having changed, what kind of method may be used for the above-mentioned etc.

By such structure system and structure, the user can easily understand the loading position of the printed matter which has a defect and the loading position of the printed matter which has a position alignment defect. Moreover, the loading position of the printed matter changed reinspection from having a defect to not having a defect is distinguishably shown as another loading position. Therefore, the user knows the loading position of the printed matter determined to be defective and the user can sort out easily the printed matter which should be sorted out.

Moreover, the printed matter determined to be defective in the paper delivery tray may be paper-ejected different from the printed matter output normally. Further, the printed matter determined to have a position alignment defect can also be made into another paper delivery tray with the structure paper-ejected by the paper delivery tray which is not paper-ejected, and by which the printed matter output normally is paper-ejected.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present advancements in which functions may be executed out of order from that shown or discussed, including substantially concurrently or in reverse order depending upon the functionality involved.

Obviously, numerous modifications and variations of the present advancements are possible in light of the above teachings. It is therefore to be understood that within the scope of the appended claims, the present advancements may be practiced otherwise than as specifically described herein.

What is claimed is:

1. An image inspection apparatus for inspecting an image output on a recording medium by scanning the recording medium as a scanned image, the image inspection apparatus comprising:

processing circuitry configured to
obtain data of an output-target image used by an image forming apparatus to conduct an image forming operation,
generate an inspection reference image from the data of the output-target image,
perform position alignment between a read image and the inspection reference image,
conduct an inspection which determines a defect in the read image based on a difference of the aligned read image and the inspection reference image,
determine whether a position alignment defect exists in the read image based on the defect detected during inspection,
obtain a captured and formed image from a medium imaged by an imaging function of an information processing terminal connected to the inspection apparatus,
extract a predetermined marker image displayed at a position into which an inspected paper was loaded and a predetermined positional relationship from the obtained captured image,
compute a position of the paper at which the defect was detected in the inspected recording medium based on the result of the inspection,
perform the following based on the position of the paper at which the extracted marker image and the computed defect were detected:
superimpose and distinguishably display on the obtained captured image the identification information for identifying the loading position of the paper corresponding to the read image on which the defect was detected and the identification information for identifying the loading position of the paper corresponding to the read image determined to have a position alignment defect.

2. The image inspection apparatus of claim 1, wherein the processing circuitry is further configured to
compute a loading position of paper on which the defect was detected in the paper loaded into a paper delivery tray based on the result of the inspection which determines the defect, the paper delivery tray being a paper ejection destination of the paper corresponding to the read image, and
cause the display of a height of the defect for every predetermined interval in the direction into which a paper is loaded in said paper delivery tray based on the computed loading position such that the loading position on the paper delivery tray of the paper corresponding to the read image determined to have a position alignment defect is distinguishably identified, the loading position on the paper delivery tray of the paper corresponding to the read image where the defect was detected.

3. The image inspection apparatus of claim 1, wherein the circuitry is further configured to display a result of the inspection of the read image determined to have a position alignment defect distinguishably from results of other inspections of other read images.

4. An image inspection method for inspecting an image output on a recording medium by scanning the recording medium as a scanned image, the image inspection method comprising:
obtaining data of an output-target image used by an image forming apparatus to conduct an image forming operation;

generating an inspection reference image from the data of the output-target image;

performing position alignment between a read image and the inspection reference image;

conducting, via a processor, an inspection which determines a defect in the read image based on the difference of the aligned read image and the inspection reference image;

determining whether a position alignment defect exists in the read image based on the defect detected during inspection;

obtaining a captured and formed image from a medium imaged by an imaging function of an information processing terminal connected to an inspection apparatus, extracting a predetermined marker image displayed at a position into which the inspected paper was loaded and a predetermined positional relationship from the obtained captured image;

computing a position of the paper at which the defect was detected in the inspected recording medium based on the result of the inspection;

performing the following based on the position of the paper at which the extracted marker image and the computed defect were detected: and superimposing and distinguishably displaying on the obtained captured image the identification information for identifying the loading position of the paper corresponding to the read image on which the defect was detected and the identification information for identifying the loading position of the paper corresponding to the read image determined to have a position alignment defect.

5. A non-transitory computer-readable medium having computer-readable instructions thereon which when executed by a computer cause the computer to perform a method for inspecting an image output on a recording medium by scanning the recording medium as a scanned image, the method comprising:

obtaining data of an output-target image used by an image forming apparatus to conduct an image forming operation;

generating an inspection reference image from the data of the output-target image;

performing position alignment between a read image and the inspection reference image;

conducting an inspection which determines a defect in the read image based on the difference of the aligned read image and the inspection reference image;

determining whether a position alignment defect exists in the read image based on the defect detected during inspection;

obtaining a captured and formed image from a medium imaged by an imaging function of an information processing terminal connected to an inspection apparatus, extracting a predetermined marker image displayed at a position into which the inspected paper was loaded and a predetermined positional relationship from the obtained captured image;

computing a position of the paper at which the defect was detected in the inspected recording medium based on the result of the inspection;

performing the following based on the position of the paper at which the extracted marker image and the computed defect were detected: and superimposing and distinguishably displaying on the obtained captured image the identification information for identifying the loading position of the paper corresponding to the read image on which the defect was detected and the identification information for identifying the loading position of the paper corresponding to the read image determined to have a position alignment defect.

* * * * *